(12) United States Patent  
Pitonyak

(10) Patent No.: US 7,621,341 B2
(45) Date of Patent: Nov. 24, 2009

(54) FURROW CLEARING APPARATUS FOR THE PREPARATION OF SEED BEDS

(75) Inventor: Thomas Edward Pitonyak, Little Rock, AR (US)

(73) Assignee: Pitonyak Machinery Corporation, Carlisle, AK (US)

( * ) Notice: Subject to any disclaimer, the term of this patent is extended or adjusted under 35 U.S.C. 154(b) by 172 days.

(21) Appl. No.: 11/837,288

(22) Filed: Aug. 10, 2007

(65) Prior Publication Data

US 2008/0035037 A1 Feb. 14, 2008

Related U.S. Application Data

(60) Provisional application No. 60/836,820, filed on Aug. 10, 2006.

(51) Int. Cl.
*A01B 5/00* (2006.01)
*A01B 49/02* (2006.01)
(52) U.S. Cl. ............... 172/150; 172/157; 172/176; 172/179
(58) Field of Classification Search ............ 172/145, 172/149, 150, 155, 157, 170, 174–176, 179
See application file for complete search history.

(56) References Cited

U.S. PATENT DOCUMENTS 2,539,632 A    1/1951   Miller
4,396,068 A    8/1983   Handy
4,669,945 A    6/1987   Pollard et al.
4,846,621 A    7/1989   Warsaw
5,340,265 A    8/1994   Grieshop
5,516,253 A    5/1996   Linscheid et al.
5,538,388 A    7/1996   Bergkamp et al.
D410,011 S     5/1999   Royer
6,017,182 A    1/2000   Grieshop
6,206,177 B1   3/2001   Broten
6,422,376 B1   7/2002   Nichols et al.
6,497,546 B2   12/2002  Wood et al.
D490,087 S     5/2004   Pitonyak et al.

*Primary Examiner*—Christopher J. Novosad
(74) *Attorney, Agent, or Firm*—Jackson Walker L.L.P.

(57) ABSTRACT

An apparatus assists in clearing furrows in a plowed field. A plurality of furrow assist members line up with a plurality of plowshares on a furrow roller which is towed around a field. The furrow roller may have one or more cylindrical rollers that may include extension rollers that are foldable for storage. Plowshares are moveably attached to rigid beams and positioned to engage the ground and dig irrigation furrows. The cylindrical rollers smooth and compact seed beds in a uniform manner. Furrow assist members, in accordance with embodiments, are selectively deployed and positioned to be substantially in line with the plowshares to clear and distribute any soil or other materials that may be in the furrows following the passage of the cylindrical rollers.

10 Claims, 5 Drawing Sheets

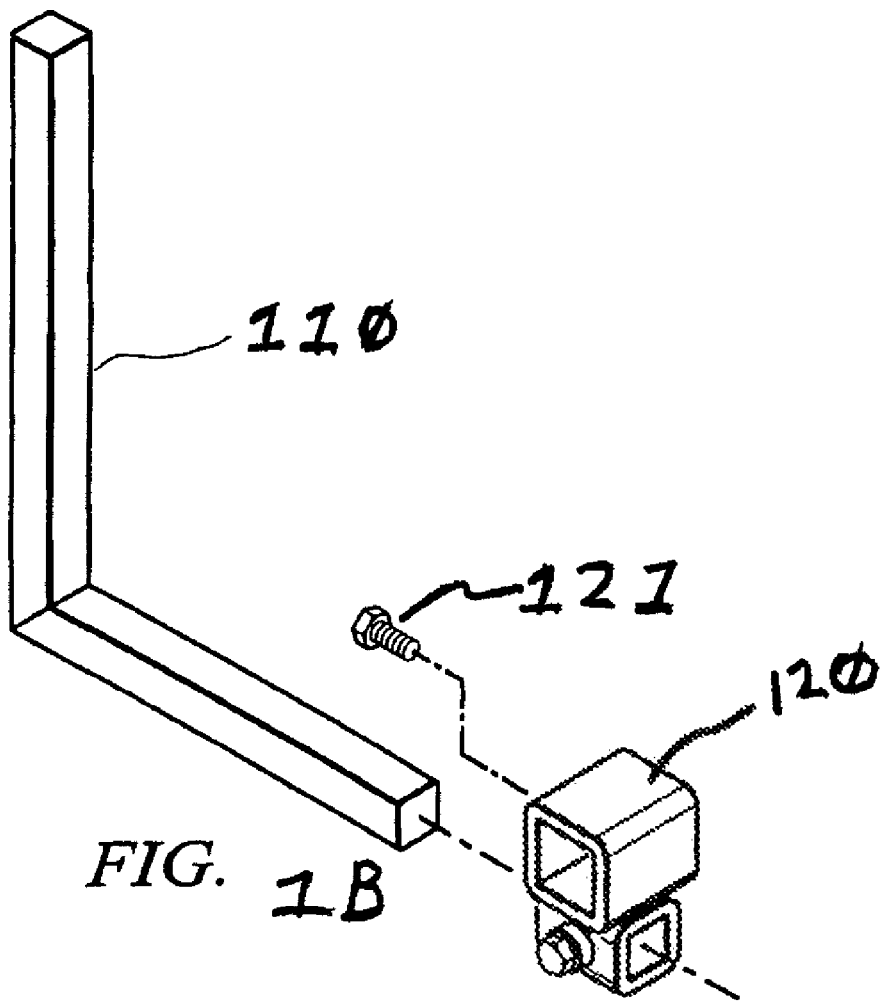

ical applica-
FURROW CLEARING APPARATUS FOR THE PREPARATION OF SEED BEDS

RELATED APPLICATIONS

This application claims the benefit of provisional application Ser. No. 60/836,820 filed Aug. 10, 2006, which is incorporated herein by reference.

BACKGROUND

1. Field of the Present Invention

The present invention generally relates to the field of agricultural implements used for field preparation and configuration, and more particularly, to a furrow clearing apparatus for seed bed preparation, configuration, and planting.

2. History of Related Art

Agricultural implements for preparing fields and configuring seed beds may employ earth-working tools mounted on horizontally disposed frames to permit working wide swaths of earth. One example of such an implement is a furrow roller which is depicted in U.S. Pat. No. 7,021,397 issued Apr. 4, 2006 titled "Folding Furrow Roller for the Preparation of Seed Beds" (which is incorporated herein in its entirety by this reference) and which furrow roller utilizes plowshares and heavy rollers connected to the frames to prepare and configure seed beds. As the furrow roller is drawn through the field, the plowshares dig irrigation furrows that produce raised earthen mounds between the furrows, and the rollers smooth and compact these raised earthen mounds so as to create uniform raised seed beds separated by uniform irrigation furrows.

However, as the rollers contact the raised earthen mounds, clumps of soil are often pushed back into the irrigation furrows that have just been dug by the plowshares. Soil at the bottom of a furrow impedes the flow of water through the furrow. In turn, due to the impeded water flow, an increased amount of water is necessary to properly irrigate each furrow and the field as a whole.

BRIEF DESCRIPTION OF THE DRAWINGS

The structure and operation of some embodiments of the claimed subject matter will become apparent upon reading the following detailed description and upon reference to the accompanying drawings in which:

FIG. 1B illustrates details for positioning an attachment member relative to a horizontal beam, which results in relative positioning of the furrow clearing apparatus from the furrow roller as illustrated in FIG. 1A;

Figure 1A:
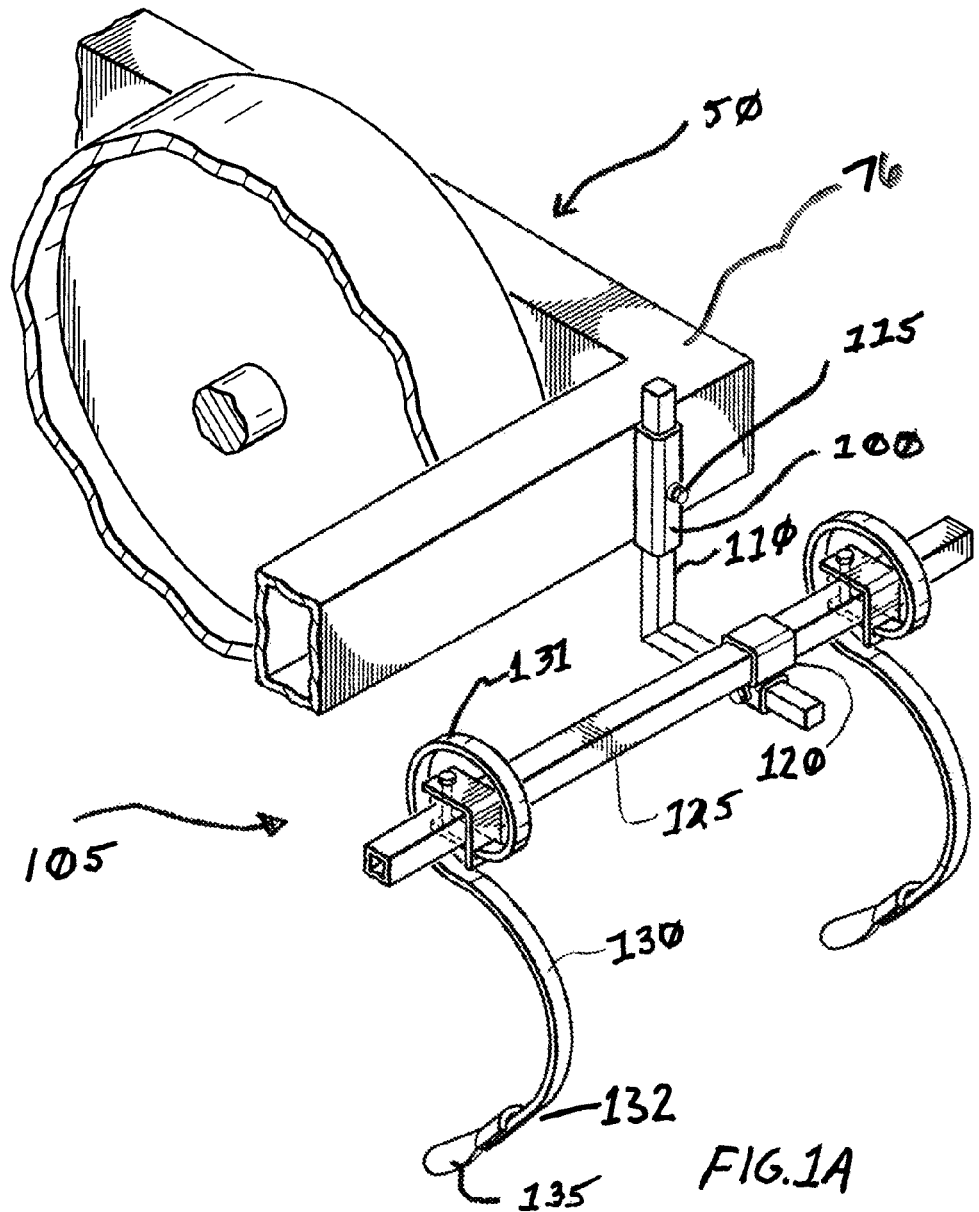
FIG. 1A is a top frontal isometric of an embodied furrow clearing apparatus coupled to a furrow roller.

While the invention is susceptible to various modifications and alternative forms, specific embodiments thereof are shown by way of example in the drawings and will herein be described in detail. It should be understood, however, that the drawings and detailed description presented herein are illustrative and not intended to limit the invention to the particular embodiments disclosed.

DETAILED DESCRIPTION OF THE INVENTION

Embodiments of the present invention generally relate to a furrow clearing apparatus that may be selectively coupled to and deployed with a furrow roller to efficiently clear clumps of dirt and other materials that may be present in the furrow following the creation of the furrow and seed beds by a furrow roller or other implement. The resulting field is intended to have uniform, cleared furrows as well as uniformly elevated seed beds. Throughout the description and the drawings, elements which are the same may be accorded the same reference numerals.

FIG. 1A is a top frontal isometric view depicting aspects of an embodiment including furrow assist assembly 105 coupled to a frame 76 of a furrow roller 50. One or more attachment sleeves 100 are coupled to frame 76 by way of welding, bolting, riveting or other connection means well known in the art. Attachment sleeve 100 is configured to receive attachment member 110 and secure the same by way of fastener 115, which may be a bolt, rivet, pin, or other fastener means well know in the art (hereinafter "fasteners"). Attachment member 110 is configured to receive beam connector 120 and secure the same with fasteners. Beam connector 120 is configured to receive horizontal beam 125 and secure the same with fasteners. FIG. 1B illustrates attachment member 110 configured to receive beam connector 120, and beam connector 120 configured to receive fastener 121 for securely positioning beam connector 120 along horizontal beam 125 (FIG. 1A).

Referring to FIG. 1A, one or more furrow assist members 130 are configured to be selectively deployed along horizontal beam 125 and include a first end 131 and a second end 132, the first end 131 configured for selective couplement to horizontal beam 125, the second end 132 depending from horizontal beam 125 and configured to receive furrow clearing plate (or duckfoot) 135. It will be appreciated that furrow clearing plate 135 may be selectively replaced or may be permanently affixed to or form a part of the second end 132 and that such furrow clearing plate 135 is shaped to efficiently contact, break apart, and uniformly distribute any dirt or other items in the furrow. It will also be appreciated that attachment sleeve 100 is configured to permit vertically adjusting attachment member 110, thereby lowering or raising furrow assist assembly 105 in relation to a field (not shown). It will be further appreciated that first end 131 is configured to permit furrow assist member 130 to be selectively positioned and secured along horizontal beam 125, preferably directly behind each plowshare of furrow roller 50, such that in operation furrow assist member 130 is positioned in the middle of each furrow created by furrow roller 50 or other implement and furrow assist member 130 is further adjusted so that furrow clearing plate 135 is positioned to contact, break apart, and uniformly distribute any dirt or other items in the furrow. It will be appreciated that furrow assist member 130 may be shaped in an "S" form or other spring-like form such that when deployed, a downward pressure is exerted by furrow clearing plate 135 so that furrow clearing plate 135 may, when it encounters resistance, flex in a backward direction (i.e., away from the resistance) and then afterwards, may return to its original position.

Figure 2:
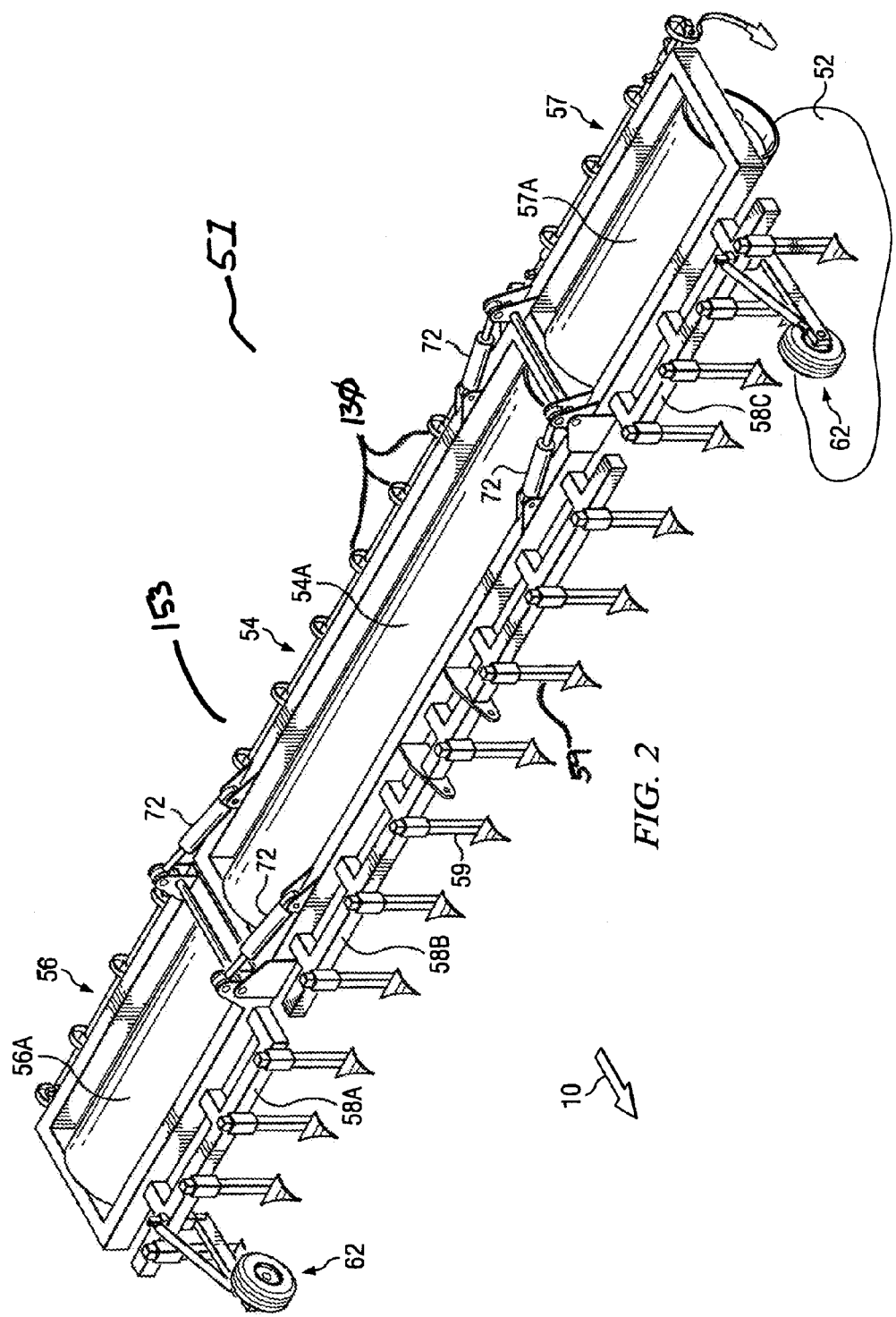
FIG. 2 is a top plan view of the furrow clearing apparatus of FIG. 1A coupled to a non-folding furrow roller.
Figure 3:
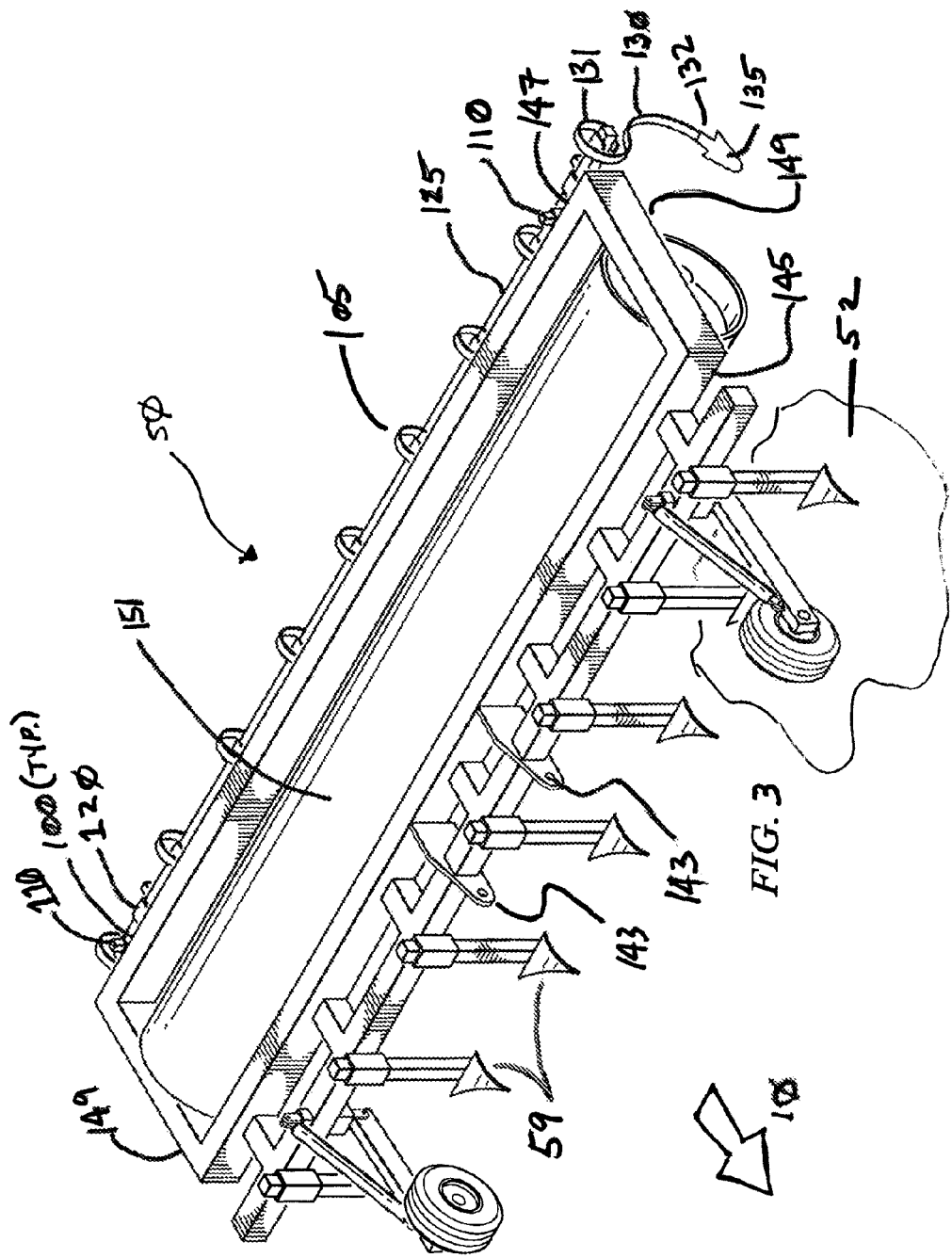
FIG. 3 is a top plan view of the furrow clearing apparatus of FIG. 1A coupled to a folding furrow roller.

FIGS. 2 and 3 are top plan views illustrating aspects of embodiments coupled to a non-folding furrow roller 50 (FIG. 3) and folding furrow roller 51 (FIG. 2). It will be appreciated that furrow assist assembly 105 and furrow assist assembly 153 each may be coupled to other field bed preparation implements that differ from folding furrow roller 51 and non-folding furrow roller 50. Folding furrow roller 51 and non-folding furrow roller 50 are designed to be towed by a suitable motorized vehicle, such as a farm tractor (not shown), over a field 52 for preparation and configuration for planting. Arrow 10 depicts the operational direction for both non-folding furrow 50 and folding furrow roller 51.

Referring to FIG. 2, folding furrow roller 51 includes a rigid center frame member 54 and one or more outboard, foldable wing members 56 and 57 that may be selectively rotated between the extended, working position illustrated in FIG. 2 and a folded, transport (i.e., storage) position (not shown) for safety and stability. Center frame member 54 and foldable wing members 56 and 57 support and contain cylindrical rollers 54A, 56A, and 57A, respectively.

Folding wing members 56 and 57 are connected to center frame member 54 and controlled by arms 72. In one embodiment, a pair of angularly inclined arms 72 is disposed on opposite top ends of both the front and rear of center frame member 54 and pivotally extends at an acute angle, as measured from center frame member 54, toward wing members 56 and 57. Each of arms 72 pivotally terminates on the front and rear edges of bordering ends of wing members 56 and 57, respectively, and is configured to manipulate wing members 56 and 57 between the extended-working position and the folded-transport or storage position. In some embodiments, arms 72 include hydraulic cylinders suitable for extending and folding wing members 56 and 57. Hydraulic cylinders of this type are commonly available from various manufacturers. One suitable model of such cylinders is a 4 inch by 8 inch hydraulic cylinder manufactured by Monarch Industries of Winnipeg, Canada.

As shown in FIG. 2, folding furrow roller 51 includes a plurality of downwardly projecting plowshares 59 that are moveably attached to rigid beams 58A, 58B, and 58C. Rigid beams 58A, 58B, and 58C are attached to the front of wing member 56, the front of center frame member 54, and the front of wing member 57, respectively. As folding furrow roller 51 is drawn through field 52, plowshares 59 engage the ground (i.e., field 52) and dig irrigation furrows that produce raised earthen mounds between the furrows. As described in FIG. 1A above, furrow assist members 130 are selectively deployed to be substantially in line with each of plowshares 59. As shown, gauge wheel assemblies 62 are connected to rigid beams 58A and 58C and provide additional support for folding furrow roller 51 as it is towed through field 52.

The raised earthen mounds created by the soil pushed up from the furrows dug by plowshares 59 become the seed beds for the desired crops. Cylindrical rollers 54A, 56A, and 57A smooth and compact the seed beds in a uniform manner and furrow assist members 130 uniformly clear and distribute any soil or other materials that may be present in the furrows following the passage by cylindrical rollers 54A, 56A, and 57A. Because cylindrical rollers 54A, 56A, and 57A are behind plowshares 59, and because furrow assist members 130 are behind cylindrical rollers 54A, 56A, and 57A, the irrigation furrows and the seed beds are not only created concurrently, but the seed beds are also concurrently smoothed and compacted in a uniform manner and any soil, clods, or other materials that may be present in the furrows are uniformly cleared and/or distributed when folding furrow roller 51 is towed through field 52.

As shown in FIG. 3, non-folding furrow roller 50 is an agricultural implement having a frame with a front beam 145, a rear beam 147, and two side beams 149. As shown, front beam 145, rear beam 147, and side beams 149 form a substantially rectangular frame. A plurality of plowshares 59 are coupled to front beam 145. As shown, furrow roller 50 includes two hitch connectors 143 mounted to front beam 145. A roller assembly 151 is rotatably coupled within the frame formed by side beams 149, rear beam 147, and front beam 145. A furrow assist assembly 153 is coupled to rear beam 147. The furrow assist assembly 153 includes at least two attachment members 110 coupled to the rear beam 147 by attachment sleeves 100. In some embodiments, attachment members 110 are L-shaped, as shown in FIG. 1A, and are positioned within attachment sleeves 100 using fasteners (e.g. fastener 115, FIG. 1A). Each attachment member 110 may be vertically adjustable with respect to each attachment sleeve 100. As shown, the furrow assist assembly 153 also includes a horizontal beam 125 coupled to the attachment sleeves 100. As shown, the furrow assist assembly 153 further includes a plurality of furrow assist connectors 120 and a plurality of furrow assist members 130. Each of the furrow assist members 130 has a first end 131 and a second end 132. The first end 131 is coupled to the horizontal beam 125. The second end 132 depends from the horizontal beam 125. A furrow clearing plate 135 is disposed at the second end 132 of each furrow assist member 130.

As shown in FIG. 3, furrow roller 50 includes one or more furrow assist connectors (i.e., beam connectors) 120. As shown in FIG. 1B, each furrow assist connector 120 may be securely positioned using fastener 121 to horizontal beam 125 (FIG. 1A). Accordingly, each furrow assist connector 120 may be slidably coupled to horizontal beam 125, thereby allowing selective positioning of each furrow assist member 130 with respect to horizontal beam 125. As shown in FIG. 1A and FIG. 3, each furrow assist member 130 is an S-tine that may provide a spring-like reaction to forces applied to furrow clearing plate 135. In such cases, furrow assist member 130 acts as a spring member.

Figure 4:
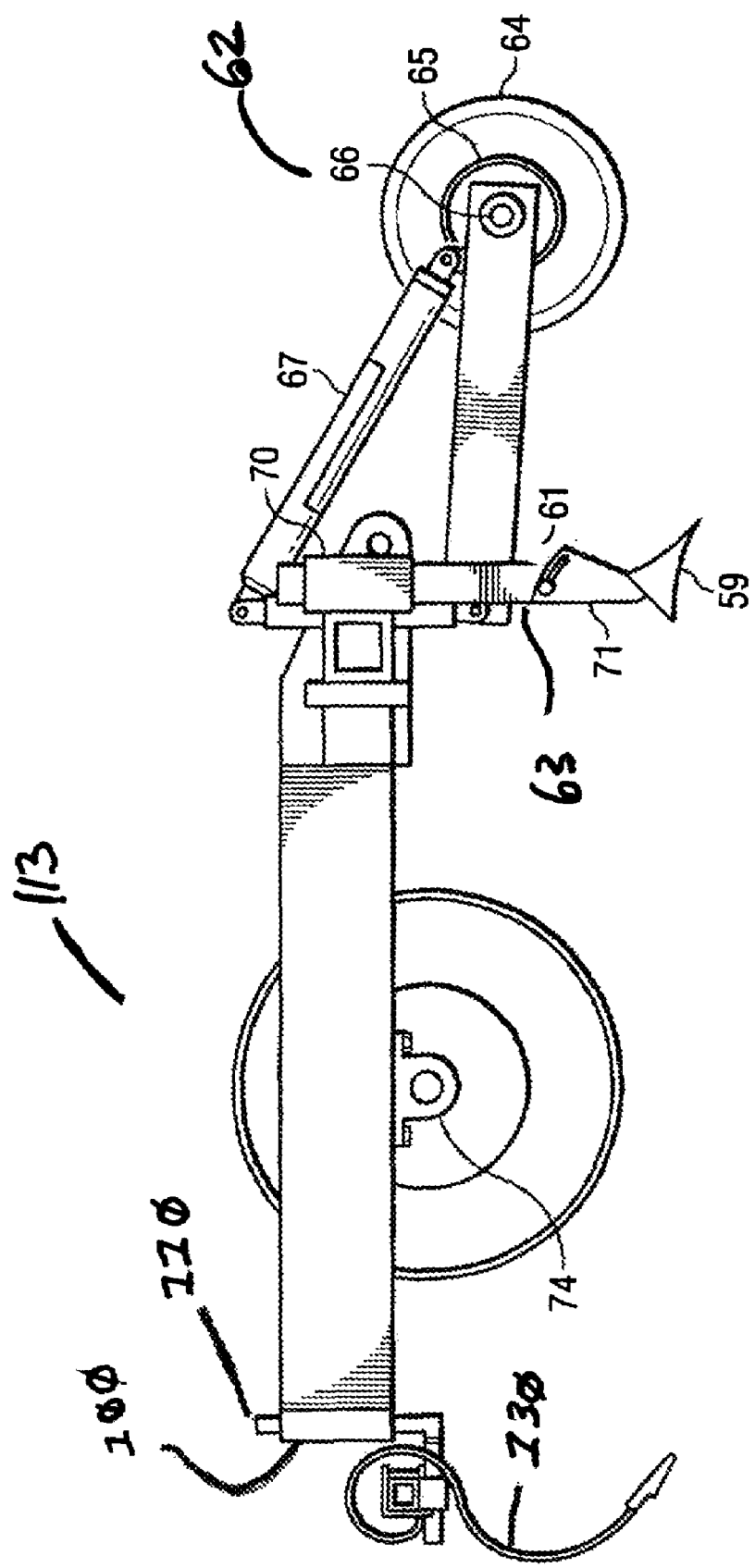
FIG. 4 is a sectional elevation view of a furrow clearing apparatus coupled to a furrow roller.

FIG. 4 is a sectional elevation view of some embodiments such as those in FIGS. 2 and 3. As shown in FIG. 4, additional support for a furrow roller 113 is provided by one or more gauge wheel assemblies 62. For example, gauge wheel assemblies 62 may be positioned substantially at each end of wing members 56 and 57 (FIG. 2) and furrow assist members 130 may be selectively positioned to be at the same approximate depth as plowshares 59 by way of adjusting the vertical height of attachment member 110 within attachment sleeve 100. Adjusting means 61 permits variable vertical and angular positioning of each of plowshares 59. In some embodiments, adjusting means 61 includes a beam 63 vertically slideable in a fixed sleeve 70 and a plate 71 angularly moveable on slideable beam 63. As shown, furrow roller 113 includes a pillow block 74, which utilizes bearings and supports the shaft for the cylindrical roller (e.g., cylindrical roller 54A in FIG. 2A).

As shown, gauge wheel assembly 62 may include a tire 64, wheel 65, and axle 66, and may be attached to wing member 56 (FIG. 2), for example, with commonly understood struts that may include adjustable linkages 67. In addition to support for wing members 56 and 57, for example, in some embodiments gauge wheel assembly 62 provides, in cooperation with a three-point hitch connection, a means of affecting and gauging the vertical displacement of a center frame, such as center frame member 54 (FIG. 2) and wing members 56 and 57. Accordingly, each of the corresponding cylindrical rollers in a furrow roller, for example, cylindrical rollers 54A, 56A, and 57A (FIG. 2) are parallel and locked to center frame member 54 (FIG. 2) in their deployed, extended, working position. Although not shown, it should be apparent to those skilled in the art that one or more gauge wheel assemblies may also be connected to center frame member 54 (FIG. 2) so as to provide additional support for furrow roller 113. In some embodiments, gauge wheel assemblies are disposed substantially at each end of center frame member 54 (FIG. 2).

It will be apparent to those with ordinary skill in the relevant art having the benefit of this disclosure that the present invention provides a foldable furrow roller with deployable wing members that is highly stabilized when deployed, but capable of easy reconfiguration for stable use, and for easy and legal transport. It is understood that the forms of the invention shown and described in the detailed description and the drawings are to be taken merely as presently preferred examples and that the invention is limited only by the language of the claims. While the present invention has been described in terms of one preferred embodiment and a few variations thereof, it will be apparent to those skilled in the art that form and detail modifications may be made to those embodiments without departing from the spirit or scope of the invention.

What is claimed is:

1. An agricultural implement comprising:
    a frame having a front beam, a rear beam and two side beams;
    a plurality of plowshares coupled to the front beam;
    at least two hitch connectors mounted to the front beam;
    a roller assembly rotatably coupled within the rectangular frame;
    a furrow assist assembly coupled to the rear beam, the furrow assist assembly comprising:
        at least two attachment members coupled to the rear beam;
        a horizontal beam coupled to the attachment members;
        a plurality of furrow assist connectors; and
        a plurality of furrow assist members having a first end and a second end, the first end coupled to the horizontal beam, the second end depending from the horizontal beam; and
        a furrow plate disposed at the second end of each furrow assist member.

2. The agricultural implement of claim 1 wherein each of the at least two attachment members have an L-shaped configuration.

3. The agricultural implement of claim 2 further comprising:
    at least two sleeves secured to the rear beam;
    a first portion of the L-shaped attachment member inserted within a sleeve; and
    a fastener securing the first portion of the L-shaped attachment member within the sleeve.

4. The agricultural implement of claim 3 further comprising the attachment member vertically adjustable with respect to the sleeve.

5. The agricultural implement of claim 1 wherein the frame comprises a substantially rectangular frame.

6. The agricultural implement of claim 1 further comprising at least two gauge wheel assemblies coupled to the front beam.

7. The agricultural implement of claim 1 wherein the furrow assist assembly further comprises a plurality of beam connectors secured to the horizontal beam by a fastener, each furrow assist member coupled to a beam connector.

8. The agricultural implement of claim 7 wherein each beam connector is slidably coupled to the horizontal beam thereby allowing selective positioning of each furrow assist member with respect to the horizontal beam.

9. The agricultural implement of claim 1 wherein the furrow assist member comprises an S-tine.

10. The agricultural implement of claim 1 wherein the furrow assist member comprises a spring member.

* * * * *